(12) United States Patent
Bellmore et al.

(10) Patent No.: US 9,809,370 B2
(45) Date of Patent: Nov. 7, 2017

(54) BARRIER SPOUT FOR A FLEXIBLE BAG AND A FLEXIBLE BAG HAVING A BARRIER SPOUT

(71) Applicant: Scholle Corporation, Irvine, CA (US)

(72) Inventors: David Bellmore, DeWitt, MI (US); Gail Becke, Mundelein, IL (US); Chris Murray, Chicago, IL (US); Andrew Crick, Hope Valley (AU)

(73) Assignee: Scholle IPN Corporation, Northlake, IL (US)

( * ) Notice: Subject to any disclaimer, the term of this patent is extended or adjusted under 35 U.S.C. 154(b) by 139 days.

(21) Appl. No.: 14/459,315

(22) Filed: Aug. 14, 2014

(65) Prior Publication Data

US 2016/0046427 A1 Feb. 18, 2016

(51) Int. Cl.

| | |
|---|---|
| *B65D 75/58* | (2006.01) |
| *B65D 25/42* | (2006.01) |
| *B32B 27/08* | (2006.01) |
| *B65D 35/44* | (2006.01) |
| *B29C 45/17* | (2006.01) |
| *B29C 45/20* | (2006.01) |
| *B29C 45/00* | (2006.01) |
| *B29L 31/00* | (2006.01) |

(Continued)

(52) U.S. Cl.
CPC ...... *B65D 75/5877* (2013.01); *B29C 45/0046* (2013.01); *B29C 45/164* (2013.01); *B29C 45/1642* (2013.01); *B29C 45/17* (2013.01); *B29C 2045/0032* (2013.01); *B29C 2045/207* (2013.01); *B29L 2031/712* (2013.01); *B32B 27/08* (2013.01); *B32B 2250/03* (2013.01); *B65D 25/42* (2013.01); *B65D 35/44* (2013.01); *B65D 47/06* (2013.01); *B65D 51/22* (2013.01)

(58) Field of Classification Search
CPC .. B29L 2009/00; B29L 2031/712; B32B 1/08; B32B 27/08; B32B 2250/03; B65D 1/0215; B65D 1/0238; B65D 23/02; B65D 25/42; B65D 35/12; B65D 35/44; B65D 51/22; B65D 47/10; B65D 47/103; B65D 47/106; B65D 75/5877; B29C 45/17; B29C 45/164; B29C 45/1642; B29C 45/0046; B29C 2045/0032; B29C 2045/207
USPC .......... 222/105–107, 566, 572, 541.1–541.9; 383/80, 906; 264/241, 645
See application file for complete search history.

(56) References Cited

U.S. PATENT DOCUMENTS

| 4,201,208 A | 5/1980 | Cambio, Jr. | |
| 4,315,724 A * | 2/1982 | Taoka | B29C 45/16 264/245 |

(Continued)

*Primary Examiner* — Paul R Durand
*Assistant Examiner* — Andrew P Bainbridge
(74) *Attorney, Agent, or Firm* — The Watson I.P. Group, PLC; Jovan N. Jovanovic; Vladan M. Vasiljevic

(57) ABSTRACT

A barrier spout having a base flange and an upstand portion. The base flange has a top surface, a bottom surface and an outer surface. The upstand portion has a proximal end extending from the base flange terminating at a distal end. An upper opening is defined at the distal end, and a lower opening is defined at the proximal end. The base flange and the upstand portion each comprise a three layer co-molded configuration including an outer layer, an inner layer and a central layer. The central layer has an oxygen transmission rate that is less than an oxygen transmission rate of either of the outer layer and the inner layer.

18 Claims, 6 Drawing Sheets

(51) Int. Cl.
*B65D 51/22* (2006.01)
*B65D 47/06* (2006.01)
*B29C 45/16* (2006.01)

(56) References Cited

U.S. PATENT DOCUMENTS

| | | | |
|---|---|---|---|
| 4,362,255 A | 12/1982 | Bond | |
| 4,931,246 A * | 6/1990 | Kudert | B65D 1/28 264/241 |
| 4,997,661 A * | 3/1991 | Kromer | B65D 11/02 156/69 |
| 5,292,034 A * | 3/1994 | Keller | B29C 43/18 222/107 |
| 5,301,840 A | 4/1994 | Sun | |
| 5,433,982 A * | 7/1995 | Yamada | B32B 27/08 222/541.1 |
| 5,556,678 A * | 9/1996 | Jupin | B29C 43/42 215/12.2 |
| 5,645,789 A * | 7/1997 | Roucher, Jr. | A61M 25/10 264/529 |
| 5,749,493 A * | 5/1998 | Boone | B65D 75/5877 222/105 |
| 6,601,732 B1 * | 8/2003 | Rooney | B32B 27/06 222/105 |
| 6,722,531 B2 * | 4/2004 | Matsuo | B65D 35/12 215/42 |
| 6,908,581 B2 * | 6/2005 | Sabin | B29C 45/1607 264/255 |
| 6,991,140 B2 * | 1/2006 | Bourque | B65D 47/148 215/48 |
| 7,757,907 B2 * | 7/2010 | Smith | B65D 75/5866 222/189.07 |
| 8,523,441 B2 * | 9/2013 | Goglio | B65D 75/5894 229/123.1 |
| 8,752,734 B2 * | 6/2014 | Smith | B67D 3/0054 222/105 |
| 2006/0201967 A1 * | 9/2006 | Romer | B65D 51/225 222/92 |
| 2008/0247684 A1 * | 10/2008 | Binks | B65D 47/2031 383/113 |
| 2012/0015122 A1 * | 1/2012 | Swenson | B29C 45/1603 428/36.7 |
| 2014/0272283 A1 * | 9/2014 | Swenson | B29C 45/231 428/137 |
| 2015/0246468 A1 * | 9/2015 | Krammer | B29C 45/1603 222/566 |

* cited by examiner

BARRIER SPOUT FOR A FLEXIBLE BAG AND A FLEXIBLE BAG HAVING A BARRIER SPOUT

CROSS-REFERENCE TO RELATED APPLICATION

Not Applicable

BACKGROUND OF THE DISCLOSURE

1. Field of the Disclosure

The disclosure relates in general to flexible packaging, and more particularly, to a barrier spout for a flexible bag that reduces the oxygen transmission rate through the spout. The disclosure is also directed to a flexible bag having a barrier spout.

2. Background Art

The use of flexible packaging is known in the art. Often the flexible packaging comprises a flexible bag having a spout that is positioned within an outer rigid container (such as a box). Often such packaging is termed bag in box packaging. In some instances, the box can be eliminated and the flexible bag may be a standalone component or may be incorporated into another package (such as a semi-rigid package, for example).

The flexible bag typically contains a flowable material such as a liquid, a syrup, a juice, a gel or the like. In many configurations, a tap is coupled to the spout to allow for the selective dispensing of the flowable material from within the bag. In other configurations, a cap may be positioned over the spout, wherein the cap includes a valve that can be actuated to control the egress of flowable material. In still other configurations, a valve may be positioned within the spout, and the valve can be actuated by a dispenser coupled to the spout. The disclosure is not limited to any particular type of means of fluid withdrawal from the flexible bag.

In many instances, the flowable material is sensitive to outside gasses and materials. For example, the flowable material is susceptible to spoilage, and degradation in quality due to oxidation. Oxidation occurs when oxygen is transmitted through the bag, the spout and the tap of the flexible bag and is directed into the flowable material. One particular beverage that is susceptible to degradation from oxygen exposure is wine. It is often the case that wine is stored in a bag in box package. Therefore, the shelf life of wine packaged in such bag in box packaging is often limited by the oxygen transmission rate of the flexible bag and its components. Decreasing the oxygen transmission rate serves to increase the shelf life of the wine within the bag in box package.

SUMMARY OF THE DISCLOSURE

The disclosure is directed to a barrier spout having a base flange and an upstand portion. The base flange has a top surface, a bottom surface and an outer surface. The upstand portion has a proximal end extending from the base flange terminating at a distal end. An upper opening is defined at the distal end, and a lower opening is defined at the proximal end. The base flange and the upstand portion each comprise a three layer co-molded configuration including an outer layer, an inner layer and a central layer. The central layer has an oxygen transmission rate that is less than an oxygen transmission rate of either of the outer layer and the inner layer.

In some configurations, the barrier spout further includes a removable diaphragm extending across one of the upper opening and the lower opening. The removable diaphragm can be cut at the respective distal or proximal end at which the removable diaphragm is positioned upon molding thereof.

In some configurations, the central layer extends through the diaphragm.

In some configurations, the removable diaphragm is substantially coplanar with the bottom surface of the base flange.

In some configurations, the barrier spout further includes an upper annular rim flange positioned proximate the distal end of the upstand portion. The upper annular rim flange has a top surface, a bottom surface and an outer surface. The removable diaphragm is substantially planar with the upper surface of the upper annular rim flange.

In some configurations, the upper annular rim flange comprises the three layer molded configuration.

In some configurations, the central layer extends to the outer surface of the upper annular rim flange.

In some configurations, the central layer is fully encapsulated by the outer layer and the inner layer.

In some configurations, the central layer extends to the outer surface of the base flange.

In some configurations, the barrier spout includes an upper annular rim flange positioned proximate the distal end of the upstand portion and a body flange positioned between the base flange and the upper annular rim flange.

In some configurations, the outer layer and the inner layer comprise the same material. In some such configurations, the outer and inner layers can each be selected from a polyolefin, such as, Ethylene Methacrylic Acid, Ethylene Vinyl Acetate, Low Density Polyethylene, Linear Low Density Polyethylene, Medium Density Polyethylene, High Density Polyethylene, Polypropylene, hereinafter consistently referred to in the remainder of the specification and the claims by the acronym's EMA,EVA,LDPE, LLDPE, MDPE, HDPE or PP respectively, while not being limited thereto. The foregoing may have a component used to promote adhesion to a barrier material, for example, and without limitation, anhydride-modified polyolefin. The central 15 layer can be selected from the barrier material such as Ethylene Vinyl Alcohol, Polyethylene Terephthalate, Glycol Modified Polyethylene Terephthalate, Polyethylene Napthalene, Polybutylene Terephthalate, Polyamide (Nylon), Polyvinylidene Chloride, Polyxylylene Adipamide, Liquid Crystal Polymer, Polyacrylonitrile, Styrene Acrylonitrile, hereinafter consistently referred to in the remainder of the specification and the claims by the acronym's EVOH, PET, PETG, PEN, PBT, PA, PVDC, MXD-6, LCP, PAN and SAN respectively.

In another aspect of the disclosure, the disclosure is directed to a method of manufacturing a barrier spout. The method comprises the steps of: co-injection molding a central layer surrounded by an inner layer and an outer layer into a barrier spout. The central layer in such a configuration has an oxygen transmission rate that is less than an oxygen transmission rate of either of the outer layer and the inner layer. The barrier spout has a base flange, an upstand portion and a removable diaphragm. The base flange has a top surface, a bottom surface and an outer surface. The upstand portion has a proximal end extending from the base flange terminating at a distal end. An upper opening is positioned at the distal end, and a lower opening is positioned at the proximal end. The removable diaphragm extends across one of the upper opening and the lower opening. The removable diaphragm effectively seals at least a portion of a respective one of the upper opening and the lower opening. The method further includes the step of cutting the removable diaphragm so as to define a respective one of the upper opening and the lower opening across which the removable diaphragm extends.

In some configurations, the method further comprises the step of attaching the base flange to a flexible bag.

In some configurations, the method further comprises the step of controlling the co-injection molding so as to encapsulate the central layer within the outer layer and the inner layer.

In some configurations, the barrier spout further comprises an upper annular rim flange.

In some configurations, the outer and inner layers are formed from the same material. In some configurations, the outer and inner layers can each be selected from a polyolefin, such as, EMA, EVA, LDPE, LLDPE, MDPE, HDPE or PP, while not being limited thereto. The foregoing may have a component used to promote adhesion to a barrier material, for example, and without limitation, anhydride-modified polyolefin. The central layer can be selected from a barrier material such as EVOH, PET, PETG, PEN, PBT, PA, PVDC, MXD-6, LCP, PAN and SAN.

BRIEF DESCRIPTION OF THE DRAWINGS

The disclosure will now be described with reference to the drawings wherein.

DETAILED DESCRIPTION OF THE DISCLOSURE

Figure 1:
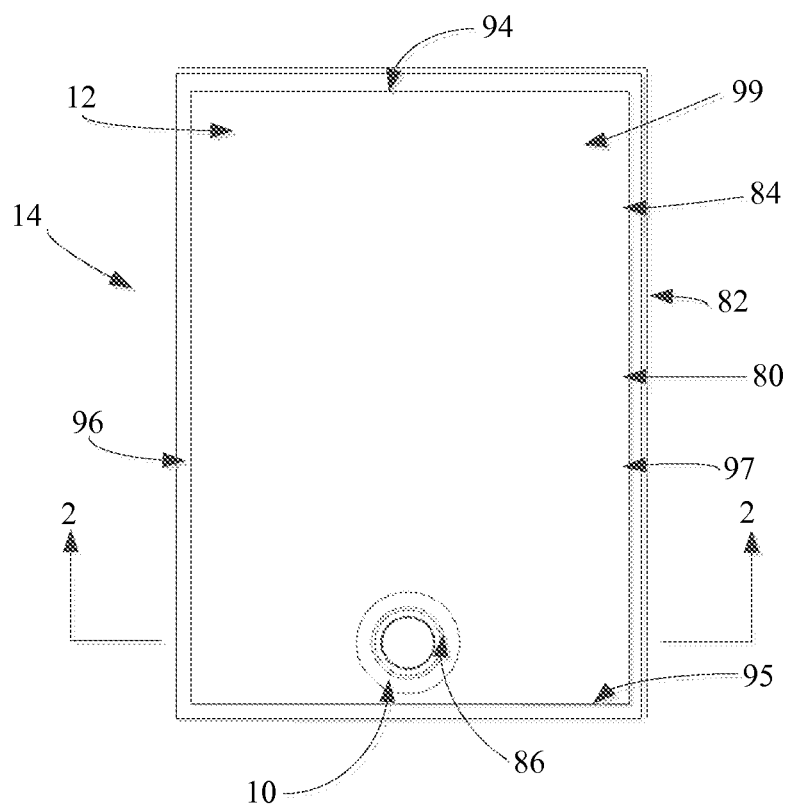
FIG. 1 of the drawings is top plan view of a flexible package of the present disclosure, showing, in particular the barrier spout of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a barrier spout of the present disclosure is shown generally at 10 as being coupled to flexible bag 12 to form bag assembly 14. The bag assembly is often placed within a rigid outer container, often termed a bag-in-box package. Such packaging is often utilized for different flowable materials, such as, including, but not limited to, chemicals, detergents, drink syrups, mixes, purees, gels and the like. Typically, a dispensing fitment is coupled to the spout, such as a tap or a cap with a valve.

It will be understood that any number of different members may be coupled to the spout 10. For example, a cap or a dispensing fitment may be coupled to the above configuration. Such connectors may include those disclosed in U.S. Pat. No. 7,387,277 issued to Verespej et al, U.S. Pat. No. 7,469,522 issued to Verespej et al, U.S. Pat. No. 7,114,625 issued to Jones, et al, U.S. Pat. No. 8,448,799 issued to Thurman, as well as various Quick connect, disconnect fittings (QCD) that are utilized in association with soft drink syrups among others. It is also contemplated that dispensers such as those disclosed in U.S. Pat. Nos. 4,619,377 and 6,978,981 both of which are issued to Roos as well as U.S. Pat. Nos. 6,045,119; 6,296,157 and 6,360,925 issued to Erb, U.S. Pat. No. 8,336,743 issued to Bellmore, U.S. Pat. No. 7,240,811 issued to Roser may be utilized. Additionally, it will be understood that the spout or the cavity may further include different structures to aid in the dispensing of flowable material.

Figure 2:
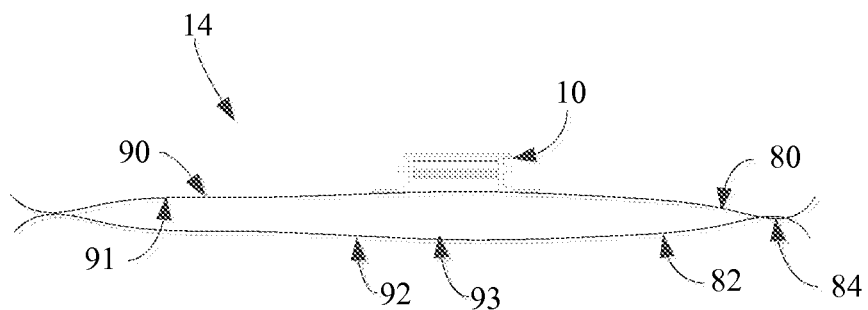
FIG. 2 of the drawings is a cross-sectional view of the flexible package of the present disclosure, showing, in particular the barrier spout of the present disclosure.

The flexible bag may comprise any number of different configurations and different materials. For example, and not limited thereto, the flexible bag 12 is shown in FIGS. 1 and 2 as comprising a pillow type bag formed from a single ply or multiple plies of polymer based film (which may be metallized or otherwise treated). Such a bag includes front panel 80 and back panel 82. Front panel 80 includes outer surface 90 and inner surface 91. The back panel 82 includes outer surface 92 and inner surface 93. The front and back panel are positioned in an overlying orientation so that the inner surfaces face each other. It will be understood that while a generally rectangular inner bag is shown, a bag of a different shape, such as a shape that mates with the cavity portion of the outer soft box may be utilized.

The panels are then coupled together by way of seals 84. In the case of a pillow type container, the seals 84 include a top seal 94, bottom seal 95, first side seal 96 and second side seal 97. The seals are generally perpendicular to adjacent seals and parallel to opposing seals to generally define a square or rectangular configuration, thereby defining a generally square or rectangular cavity 99. The seals may be formed through the application of heat, or through other procedures, including, but not limited to RF welding, ultrasonic welding, adhesive, among others. The disclosure is not limited to any particular manner of attachment of the panels.

For many pillow type containers, an opening 86 is provided through the front panel 80 proximate, but spaced apart from the bottom seal 95. The spout 10 can be coupled thereto in sealed engagement. In certain embodiments, multiple spouts may be provided, one, for example, for dispensing, and one for filling.

The spout 10 is shown in more detail in FIGS. 3 through 8 (in the manufacture form) as comprising base flange 20, cylindrical upstand 22, body flange 24, upper annular rim flange 26 and removable diaphragm 28. The base flange 20 lower surface 34, top surface 33 and outer surface 32. As will be understood to those of skill in the art, the base flange is coupled to the container body (i.e., typically a conventional pillow-type container) through welding, adhesion or other system typically joining the upper surface to the inside of the panels. The cylindrical upstand 22 extends upwardly from the base flange 20, positioned at a proximal end 40 thereof, and extends generally orthogonal thereto toward distal end 41. Typically, the cylindrical upstand is substantially uniform in cross-section and the inner surface defines a passageway with an opening at either end which provides fluid communication with the cavity of the container. An upper opening is positioned at the distal end, and a lower opening is positioned at the proximal end. While termed cylindrical, elliptical as well as other shapes are contemplated.

The body flange 24 includes upper surface 50, lower surface 51 and outer surface 52. The lower body flange is spaced apart from the base flange and is generally parallel thereto. Thus, a generally uniform lower channel 35 is defined between the flanges. Filling equipment and dispensing coupling equipment may be configured to grasp the spout 10 about the geometry defined by the defined lower channel and the associated flanges. In the embodiment shown, the body flange is of a diameter smaller than the base flange. It will be understood that variations are contemplated.

The upper annular rim flange 26 extends about the distal end of the cylindrical upstand 22. In the embodiment shown, the upper annular rim flange 26 includes upper surface 60, lower surface 61 and outer surface 62. The upper annular rim is positioned at or near the distal end 41 of the cylindrical upstand. In the configuration shown, the upper annular rim is positioned at the uppermost end of the cylindrical upstand and defines the distal end of the spout.

Figure 3:
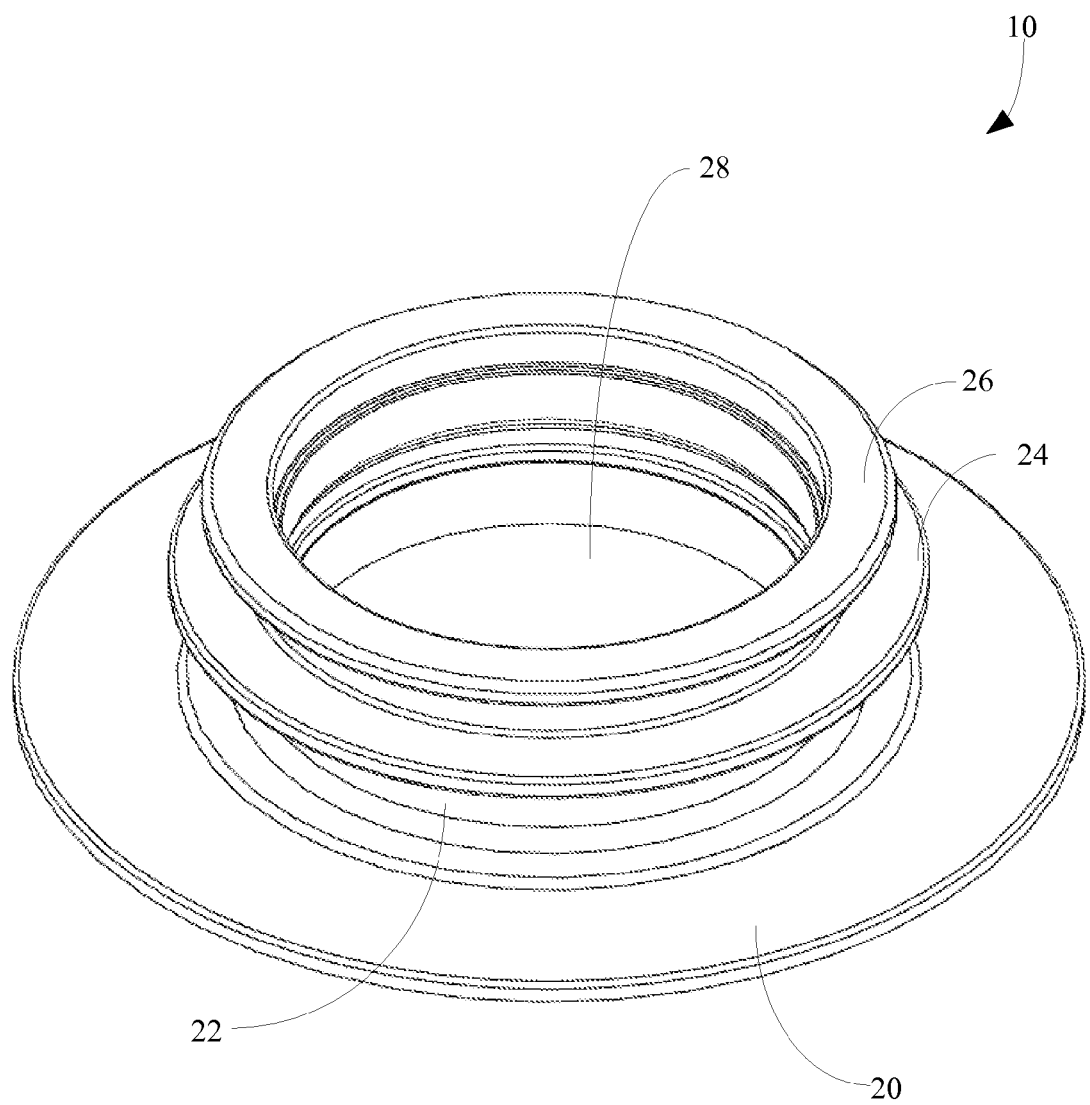
FIG. 3 of the drawing is a perspective view of one configuration of the barrier spout as manufactured of the present disclosure, prior to the removal of the removable diaphragm therefrom, with the diaphragm positioned at the proximal end of the cylindrical upstand.
Figure 4:
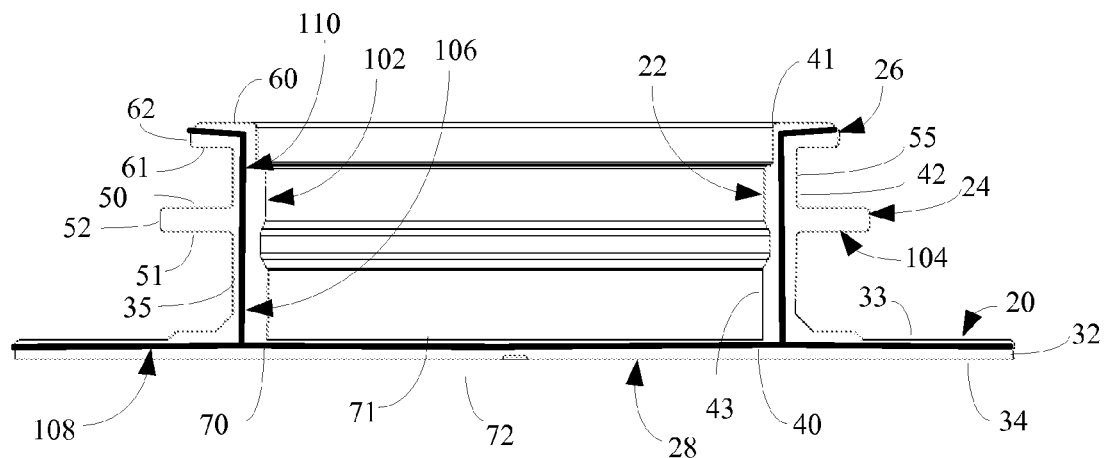
FIG. 4 of the drawings is a cross-sectional view of the configuration of the barrier spout shown in FIG. 3.
Figure 5:
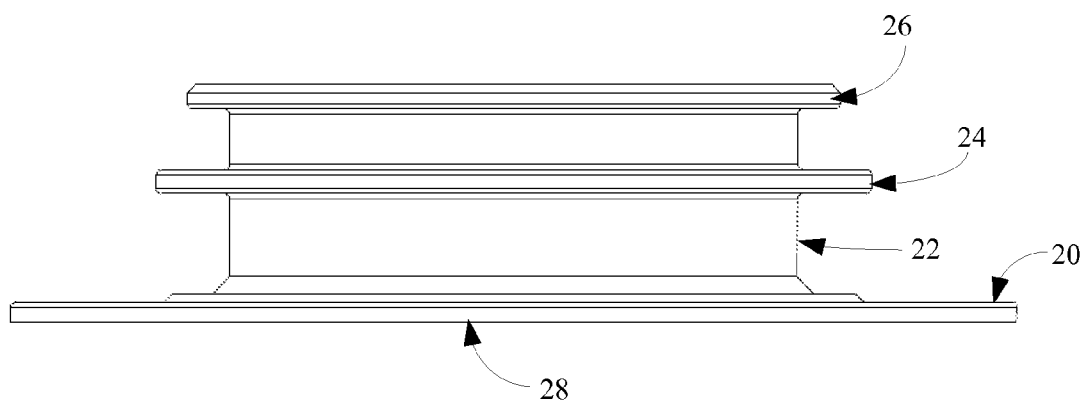
FIG. 5 of the drawings is a side elevational view of the configuration of the barrier spout shown in FIG. 3.

In the configuration of FIGS. 3 through 5, the spout, after manufacture further includes removable diaphragm 28. The removable diaphragm extends across the cylindrical upstand 22 at the proximal end 40 thereof. The removable diaphragm includes outer edge 70 which generally corresponds to the interface between the diaphragm and the cylindrical upstand, upper surface 71 and lower surface 72. In the configuration shown, the lower surface 72 is co-planar with the lower surface 34 of the base flange 20. It will be understood that prior to use of the barrier spout, and as will be explained in detail below, the removable diaphragm is removed through a cutting step so as to provide a cylindrical upstand 22 that is open at both the proximal and the distal end. However, the removable diaphragm is formed during the manufacture of the barrier spout.

Figure 6:
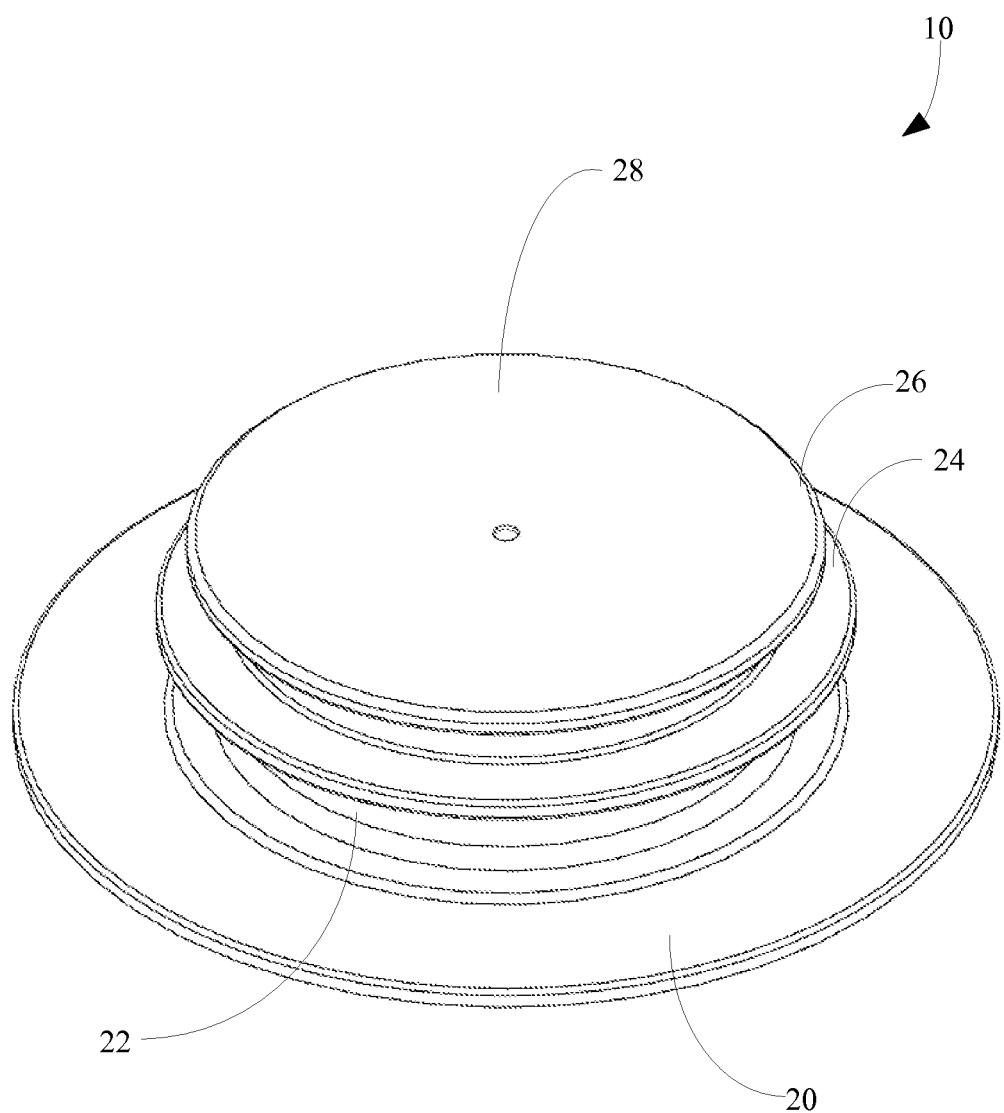
FIG. 6 of the drawings is a perspective view of a second configuration of the barrier spout as manufactured of the present disclosure, prior to the removal of the removable diaphragm therefrom, with the diaphragm positioned at the distal end of the cylindrical upstand.
Figure 7:
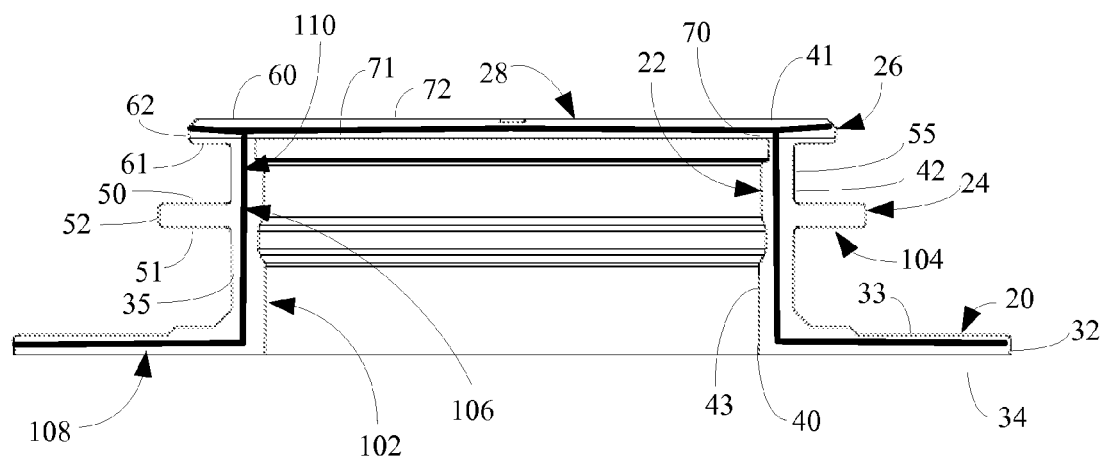
FIG. 7 of the drawings is a cross-sectional view of the configuration of the barrier spout shown in FIG. 6.
Figure 8:
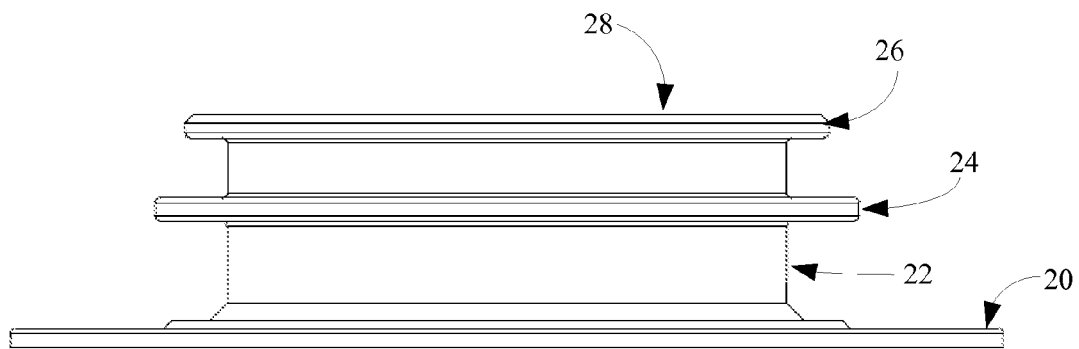
FIG. 8 of the drawings is a side elevational view of the configuration of the barrier spout shown in FIG. 6.

In the configuration of FIG. 6 through 8, the removable diaphragm 28 is positioned at the distal end 41 of the cylindrical upstand 22. In such a configuration, the upper surface 71 of the removable diaphragm is substantially co-planar with the upper surface 60 of the upper annular rim flange. Again, the removable diaphragm is formed during the manufacture of the barrier spout and removed prior to use thereof.

Referring now to FIGS. 4, 7 and 9 through 11, the barrier spout 10 is formed from three layers of material that are co-molded. In particular, the three layers comprise inner layer 102, outer layer 104 and central layer 106. The outer layer is predominantly the layer that is contacted during handling of the flexible bag. The inner layer is predominantly the layer that is in contact with the flowable material positioned within the flexible bag. The central layer has limited contact through handling, or with the flowable material.

The central layer includes flange region 108 and upstand region 110. In the embodiment shown, the central layer extends from the outer surface 32 of the base flange 20 through the base flange and transitions to the cylindrical upstand. In the configuration of FIG. 4, the central layer 106 extends through the removable diaphragm such that the portion that extends through the cylindrical upstand 22, namely upstand region 110, intersects the flange region that is generally continuous with the central layer within the removable diaphragm 28. In the embodiment of FIG. 7, the central layer extends through the base flange 20, the cylindrical upstand 22 and through the removable diaphragm 28. The central layer having an oxygen transmission rate that is less than an oxygen transmission rate of either of the outer layer and the inner layer.

In the configurations, the central layer extends to the outer surface 32 on the base flange at one end and, when the removable diaphragm is removed (from the configuration of FIG. 4) the central layer extends to the inner surface of the cylindrical upstand at the proximal end 40 and at the distal end 41 (proximate or at the upper annular rim flange 26).

In the configuration of FIG. 7, the central layer extends to the outer surface 32 on the base flange at one end, and with the removable diaphragm being removed, the central layer extends to the distal end of the cylindrical upstand, or the upper surface of the upper annular rim flange 26.

It will be understood that, in other embodiments, the central layer may be encapsulated by the outer layer and the inner layer. That is, the central layer may stop short of the outer surface 32 and may stop short of the distal end 41 of the cylindrical upstand or the upper surface 60 of the upper annular rim flange.

The outer layer and the inner layer are preferably the same material, and, while a material is not limiting, the inner and outer layers 102, 104 can each be selected from a polyolefin, such as, EMA, EVA, LDPE, LLDPE, MDPE, HDPE or PP, while not being limited thereto. The foregoing may have a component used to promote adhesion to a barrier material, for example, and without limitation, anhydride-modified polyolefin. The central layer 106 can be selected from a barrier material such as EVOH, PET, PETG, PEN, PBT, PA, PVDC, MXD-6, LCP, PAN and SAN.

To manufacture the barrier spout 10 of the present disclosure, a hot runner system for co-injection molding is utilized. Such equipment is available from Kortec of Rowley, Mass. Typically, such equipment can be utilized to form generally center gated and generally symmetrical elements. Problematically, a spout is not typically center gated. More specifically, as the spout is open at both ends. As such, the availability of such co-molding for spouts has not been possible.

Figure 9:
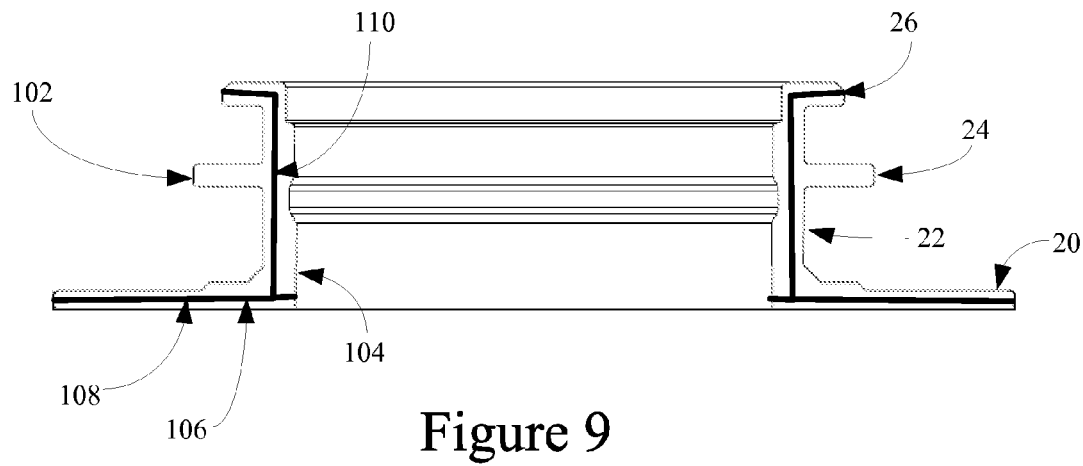
FIG. 9 of the drawings is a cross-sectional view of the configuration of the barrier spout shown in FIG. 3, showing removal of the upper annular rim flange.
Figure 10:
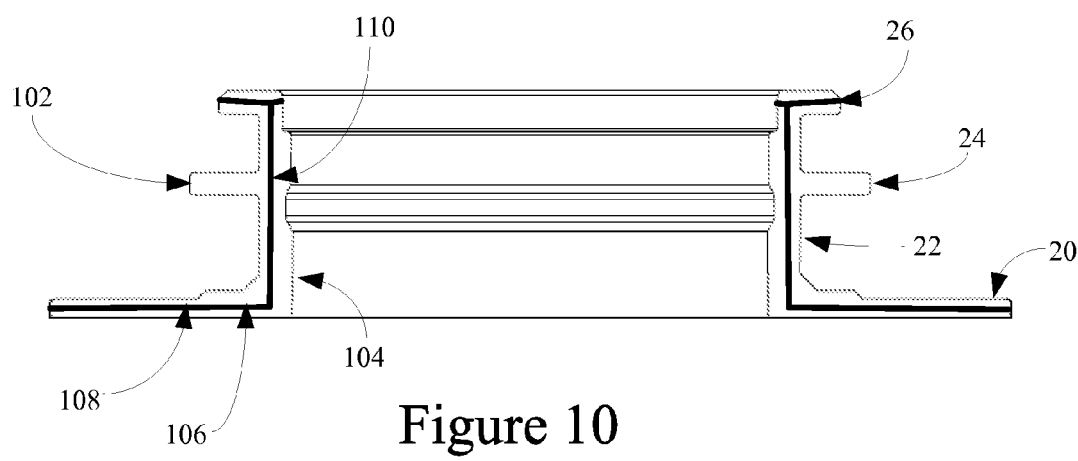
FIG. 10 of the drawings is a cross-sectional view of the configuration of the barrier spout shown in FIG. 6, showing removal of the upper annular rim flange.
Figure 11:
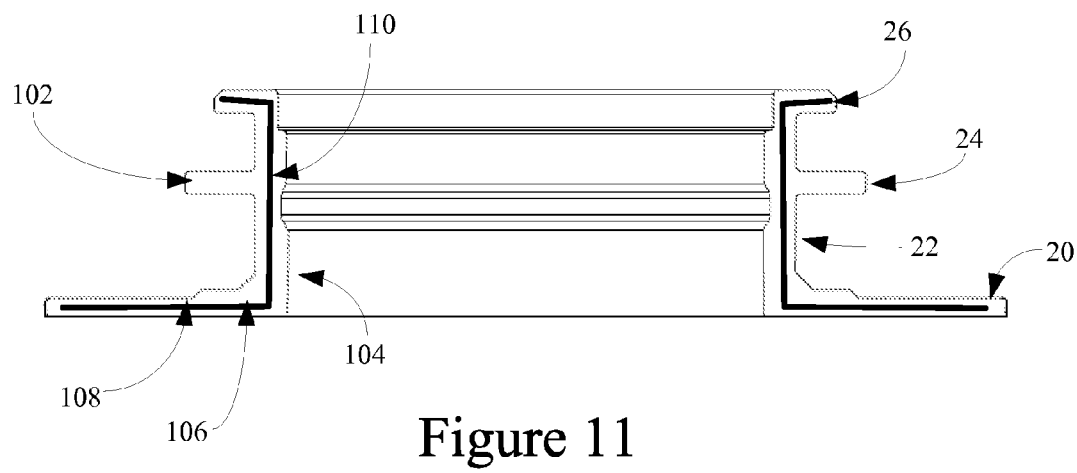
FIG. 11 of the drawings is a cross-sectional view of the configuration of the barrier spout shown in FIG. 6, showing an encapsulated central layer.

To overcome the inherent inability to create a spout of the type disclosed above for a flexible bag, the removable diaphragm has been provided. With the removable diaphragm, the barrier spout can be formed utilizing such a method of manufacturing. That is, the removable diaphragm forms a spout that is, for manufacturing purposes center gated and generally symmetrical. The molded barrier spout can undergo additional processing to remove the removable diaphragm. A spout ready for incorporation with a flexible bag is shown in FIGS. 9 through 11.

In some configurations, it will be understood that the central layer (which may also be referred to as a core layer) may be injected into the mold after the initiation of the outer and inner layers (which also may be referred to as skin layers) and may be stopped prior to the stopping of the outer and inner layers. In such a configuration, the central layer can be encapsulated by the inner and outer layers. One such configuration is shown in FIG. 11.

In other embodiments, all three layers are injected such that all three layers are visible at the outer surface of the base flange and at the distal end of the cylindrical upstand, or the upper surface of the upper annular rim flange 26. One such configuration is shown in FIG. 9, wherein the removable diaphragm 28 was at the proximal end of the cylindrical upstand prior to removal. Another configuration is shown in FIG. 10 wherein the removable diaphragm 28 was at the distal end of the cylindrical upstand prior to removal.

Through testing, it has been found that a conventional three liter flexible bag having a spout and a tap has an oxygen transmission rate of approximately 0.6 cc/pkg/day@100% $O_2$. Of that, the oxygen transmission rate of the spout is almost a third of the overall oxygen transmission rate, or approximately 0.2 cc/pkg/day@100% $O_2$. By utilizing the barrier spout of the present disclosure, the oxygen transmission can be reduced to 0.0 cc/pkg/day@100% $O_2$, or a reduction to the entire flexible bag to 0.4 cc/pkg/day@100% $O_2$. Such a reduction translates to a substantial extension of the shelf life of, for example, wine. It is believed that the shelf life extension would be approximately 90 days.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A barrier spout comprising:
    a base flange having a top surface, a bottom surface and an outer surface;
    an upstand portion having a proximal end extending from the base flange terminating at a distal end, with an upper opening at the distal end, and a lower opening at the proximal end;
    a removable diaphragm extending across one of the upper opening and the lower opening, which removable diaphragm being cuttable at the respective distal or proximal end at which the removable diaphragm is positioned upon molding thereof
    wherein the base flange, the upstand portion and the removable diaphragm structurally comprise a co-injection molded structure, base flange and the upstand portion each comprise a three layer co-injection molded configuration, with an outer layer, an inner layer and a central layer, the central layer having an oxygen transmission rate that is less than an oxygen transmission rate of either of the outer layer and the inner layer.

2. The barrier spout of claim 1 wherein the central layer extends through the diaphragm.

3. The barrier spout of claim 1 wherein the removable diaphragm is substantially coplanar with the bottom surface of the base flange.

4. The barrier spout of claim 1 further comprising an upper annular rim flange positioned proximate the distal end of the upstand portion, the upper annular rim flange having a top surface, a bottom surface and an outer surface, wherein the removable diaphragm is substantially planar with the upper surface of the upper annular rim flange.

5. The barrier spout of claim 4 wherein the upper annular rim flange comprises the three layer co-injection molded configuration.

6. The barrier spout of claim 5 wherein the central layer extends to the outer surface of the upper annular rim flange.

7. The barrier spout of claim 1 wherein the central layer is fully encapsulated by the outer layer and the inner layer.

8. The barrier spout of claim 1 wherein the central layer extends to the outer surface of the base flange.

9. The barrier spout of claim 1 further comprising an upper annular rim flange positioned proximate the distal end of the upstand portion and a body flange positioned between the base flange and the upper annular rim flange.

10. The barrier spout of claim 1 wherein the outer layer and the inner layer comprise the same material.

11. The barrier spout of claim 10 wherein the outer and inner layers can each be selected from the group consisting of a polyolefin, EMA, EVA, LDPE, LLDPE, MDPE, HDPE and PP, and wherein the central layer can be selected from the group consisting of EVOH, PET, PETG, PEN, PBT, PA, PVDC, MXD-6, LCP, PAN and SAN.

12. The barrier spout of claim 1, wherein the removable diaphragm is substantially uniform in thickness.

13. A method of manufacturing a barrier spout comprising the steps of:
    co-injection molding a central layer surrounded by an inner layer and an outer layer into a barrier spout, with the central layer having an oxygen transmission rate that is less than an oxygen transmission rate of either of the outer layer and the inner layer, the barrier spout comprising:
        a base flange having a top surface, a bottom surface and an outer surface;
        an upstand portion having a proximal end extending from the base flange terminating at a distal end, with an upper opening at the distal end, and a lower opening at the proximal end;
        a removable diaphragm extending across one of the upper opening and the lower opening, effectively sealing at least a portion of a respective one of the upper opening and the lower opening;
    cutting the removable diaphragm so as to define a respective one of the upper opening and the lower opening across which the removable diaphragm extends, prior to attachment of the spout to a bag.

14. The method of claim 13, further comprising the step of: attaching the base flange to a flexible bag.

15. The method of claim 13 further comprising the step of controlling the co-injection molding so as to encapsulate the central layer within the outer layer and the inner layer.

16. The method of claim 13 wherein the barrier spout further comprises an upper annular rim flange.

17. The method of claim 13 wherein the outer and inner layers are formed from the same material.

18. The method of claim 17 wherein the outer and inner layers can each be selected from the group consisting of a polyolefin, EMA, EVA, LDPE, LLDPE, MDPE, HDPE and PP, and wherein the central layer can be selected from the group consisting of EVOH, PET, PETG, PEN, PBT, PA, PVDC, MXD-6, LCP, PAN and SAN.

* * * * *